(12) United States Patent
Wu et al.

(10) Patent No.: US 10,436,884 B2
(45) Date of Patent: Oct. 8, 2019

(54) CALIBRATION OF LASER AND VISION SENSORS

(71) Applicant: SZ DJI TECHNOLOGY CO., LTD., Shenzhen (CN)

(72) Inventors: Kanzhi Wu, Shenzhen (CN); Lu Ma, Shenzhen (CN)

(73) Assignee: SZ DJI Technology Co., Ltd., Shenszhen (CN)

(*) Notice: Subject to any disclaimer, the term of this patent is extended or adjusted under 35 U.S.C. 154(b) by 0 days.

(21) Appl. No.: 15/730,617

(22) Filed: Oct. 11, 2017

(65) Prior Publication Data
US 2018/0313940 A1 Nov. 1, 2018

Related U.S. Application Data

(63) Continuation of application No. PCT/CN2017/082604, filed on Apr. 28, 2017.

(51) Int. Cl.
H04N 7/18 (2006.01)
G01S 7/497 (2006.01)
(Continued)

(52) U.S. Cl.
CPC ............ G01S 7/497 (2013.01); G01S 7/4808 (2013.01); G01S 7/4972 (2013.01); G01S 17/023 (2013.01); G01S 17/89 (2013.01); G01S 17/93 (2013.01); G05D 1/0202 (2013.01); G05D 1/024 (2013.01); G05D 1/0246 (2013.01); G05D 1/0248 (2013.01); G06K 9/46 (2013.01); G06T 7/13 (2017.01); G06T 7/136 (2017.01); G06T 7/85 (2017.01); G01S 17/936 (2013.01); G05D 2201/0213 (2013.01); G06T 2207/10021 (2013.01); G06T 2207/10024 (2013.01);
(Continued)

(58) Field of Classification Search
CPC ..... G06T 7/0028; G06T 7/0042; G06T 7/579; G01B 11/24; G01B 11/00; B60R 1/00; H04N 13/0275
USPC .................. 345/419; 348/148, 144; 382/199
See application file for complete search history.

(56) References Cited

U.S. PATENT DOCUMENTS 4,283,116 A 8/1981 Weis
5,179,565 A 1/1993 Tsuchiya et al.
(Continued)

FOREIGN PATENT DOCUMENTS

CN 101216562 A 7/2008
CN 101256232 A 9/2008
(Continued)

OTHER PUBLICATIONS

Aijazi, et al., "Segmentation Based Classification of 3D Urban Point Clouds: A Super-Voxel Based Approach with Evaluation," (2013), 27 pages.
(Continued)

Primary Examiner — Gims S Philippe
(74) Attorney, Agent, or Firm — Finnegan, Henderson, Farabow, Garrett & Dunner, LLP

(57) ABSTRACT

Automatic calibration between laser and vision sensors carried by a mobile platform, and associated systems and methods are disclosed herein. A representative method includes evaluating depth-based feature points obtained from the laser sensor with edge information obtained from the vision sensor and generating calibration rules based thereon.

26 Claims, 11 Drawing Sheets

(51) Int. Cl.
*G01S 17/93* (2006.01)
*G06K 9/46* (2006.01)
*G06T 7/136* (2017.01)
*G06T 7/13* (2017.01)
*G06T 7/80* (2017.01)
*G05D 1/02* (2006.01)
*G01S 17/02* (2006.01)
*G01S 17/89* (2006.01)
*G01S 7/48* (2006.01)

(52) U.S. Cl.
CPC ............... *G06T 2207/10028* (2013.01); *G06T 2207/10032* (2013.01); *G06T 2207/10152* (2013.01); *G06T 2207/30248* (2013.01); *G06T 2207/30252* (2013.01)

(56) References Cited

U.S. PATENT DOCUMENTS

| | | |
|---|---|---|
| 5,249,046 A | 9/1993 | Ulich et al. |
| 6,101,455 A | 8/2000 | Davis |
| 6,246,258 B1 | 6/2001 | Lesea |
| 6,344,937 B1 | 2/2002 | Sparrold et al. |
| 6,666,855 B2 | 12/2003 | Somani et al. |
| 7,085,400 B1 | 8/2006 | Holsing et al. |
| 7,236,299 B1 | 6/2007 | Smith et al. |
| 7,336,407 B1 | 2/2008 | Adams et al. |
| 7,564,571 B2 | 7/2009 | Karabassi et al. |
| 7,843,448 B2 | 11/2010 | Wheeler et al. |
| 7,899,598 B2 | 3/2011 | Woon et al. |
| 8,224,097 B2 | 7/2012 | Matei et al. |
| 8,396,293 B1 | 3/2013 | Korah et al. |
| 8,488,877 B1 | 7/2013 | Owechko et al. |
| 8,503,046 B2 | 8/2013 | Mikkelsen et al. |
| 8,605,998 B2 | 12/2013 | Samples et al. |
| 8,620,089 B1 | 12/2013 | Korah et al. |
| 8,665,122 B2 | 3/2014 | Klepsvik |
| 8,773,182 B1 | 7/2014 | Degani et al. |
| 8,798,372 B1 | 8/2014 | Korchev et al. |
| 9,076,219 B2 | 7/2015 | Cha et al. |
| 9,097,804 B1 | 8/2015 | Silver et al. |
| 9,098,753 B1 | 8/2015 | Zhu et al. |
| 9,128,190 B1 | 9/2015 | Ulrich et al. |
| 9,369,697 B2 * | 6/2016 | Kumagai ............ H04N 13/0275 |
| 9,383,753 B1 | 7/2016 | Templeton et al. |
| 9,396,545 B2 | 7/2016 | Fu et al. |
| 9,470,548 B2 | 10/2016 | Ahn et al. |
| 9,584,748 B2 | 2/2017 | Saito |
| 9,644,857 B1 | 5/2017 | Ashgriz et al. |
| 9,659,378 B2 | 5/2017 | Sasaki et al. |
| 2004/0135992 A1 | 7/2004 | Munro |
| 2005/0248749 A1 | 11/2005 | Kiehn et al. |
| 2005/0254628 A1 | 11/2005 | Saladin et al. |
| 2007/0214687 A1 | 9/2007 | Woon et al. |
| 2007/0296951 A1 | 12/2007 | Kuijk et al. |
| 2008/0114253 A1 | 5/2008 | Randall et al. |
| 2008/0319706 A1 | 12/2008 | Uffenkamp et al. |
| 2009/0292468 A1 | 11/2009 | Wu et al. |
| 2009/0310867 A1 | 12/2009 | Matei et al. |
| 2010/0271615 A1 | 10/2010 | Sebastian et al. |
| 2011/0285981 A1 | 11/2011 | Justice et al. |
| 2012/0032541 A1 | 2/2012 | Chen et al. |
| 2012/0121166 A1 | 5/2012 | Ko et al. |
| 2012/0170024 A1 | 7/2012 | Azzazy et al. |
| 2012/0170029 A1 | 7/2012 | Azzazy et al. |
| 2012/0248288 A1 | 10/2012 | Linder et al. |
| 2012/0256916 A1 * | 10/2012 | Kitamura ............ G01B 11/24 345/419 |
| 2013/0107243 A1 | 5/2013 | Ludwig et al. |
| 2013/0284475 A1 | 10/2013 | Hirabayashi et al. |
| 2013/0329065 A1 | 12/2013 | Haraguchi et al. |
| 2014/0049765 A1 | 2/2014 | Zheleznyak et al. |
| 2014/0071121 A1 | 3/2014 | Russ et al. |
| 2014/0132723 A1 | 5/2014 | More |
| 2014/0368651 A1 | 12/2014 | Irschara et al. |
| 2015/0185313 A1 | 7/2015 | Zhu |
| 2015/0206023 A1 * | 7/2015 | Kochi ................ G01B 11/00 382/199 |
| 2015/0219920 A1 | 8/2015 | Ando et al. |
| 2016/0070981 A1 * | 3/2016 | Sasaki ................ B60R 1/00 348/148 |
| 2016/0154999 A1 | 6/2016 | Fan et al. |
| 2016/0311528 A1 | 10/2016 | Nemovi et al. |
| 2016/0327779 A1 | 11/2016 | Hillman |
| 2017/0046840 A1 * | 2/2017 | Chen ................ G06T 7/0028 |
| 2017/0046845 A1 * | 2/2017 | Boyle ................ G06T 7/0042 |
| 2017/0153319 A1 | 6/2017 | Villeneuve et al. |
| 2017/0178352 A1 * | 6/2017 | Harmsen ............ G06T 7/579 |
| 2017/0227628 A1 | 8/2017 | Zheleznyak et al. |
| 2017/0248698 A1 | 8/2017 | Sebastian et al. |
| 2017/0316701 A1 | 11/2017 | Gil et al. |
| 2018/0357503 A1 | 12/2018 | Wang et al. |
| 2018/0365835 A1 | 12/2018 | Yan et al. |

FOREIGN PATENT DOCUMENTS

| | | |
|---|---|---|
| CN | 202182717 U | 4/2012 |
| CN | 102508255 A | 6/2012 |
| CN | 102944224 A | 2/2013 |
| CN | 102971657 A | 3/2013 |
| CN | 103257342 A | 8/2013 |
| CN | 103257348 A | 8/2013 |
| CN | 103403577 A | 11/2013 |
| CN | 103499819 A | 1/2014 |
| CN | 103727930 A | 4/2014 |
| CN | 203645633 U | 6/2014 |
| CN | 103969637 A | 8/2014 |
| CN | 103983963 A | 8/2014 |
| CN | 104142157 A | 11/2014 |
| CN | 104463872 A | 3/2015 |
| CN | 104600902 A | 5/2015 |
| CN | 105517903 A | 4/2016 |
| CN | 105628026 A | 6/2016 |
| CN | 105759253 A | 7/2016 |
| CN | 106019296 A | 10/2016 |
| CN | 106019923 A | 10/2016 |
| CN | 106030431 A | 10/2016 |
| CN | 106063089 A | 10/2016 |
| CN | 106093958 A | 11/2016 |
| CN | 106093963 A | 11/2016 |
| CN | 106199622 A | 12/2016 |
| CN | 106597414 A | 4/2017 |
| CN | 106597416 A | 4/2017 |
| CN | 107037721 A | 8/2017 |
| GB | 2507560 A | 5/2014 |
| JP | 63194211 A | 8/1988 |
| JP | 2002199682 A | 7/2002 |
| JP | 2005321547 A | 11/2005 |
| JP | 2015200555 A | 11/2015 |
| JP | 6076541 B2 | 2/2017 |
| KR | 101665938 B1 | 10/2016 |
| WO | 2014048475 A | 4/2014 |
| WO | 2015148824 A1 | 10/2015 |
| WO | 2016127357 A1 | 8/2016 |
| WO | 2016170333 A1 | 10/2016 |
| WO | 2014021778 A2 | 2/2017 |

OTHER PUBLICATIONS

Douillard, et al., "On the Segmentation of 3D LIDAR Point Clouds," (2011), 8 pages.

Hackel, et al., "Fast Semantic Segmentation of 3D Point Clouds with Strongly Varying Density," (2016), 8 pages.

Levinson, et al., "Automatic Online Calibration of Cameras and Lasers," (2013), 8 pages.

Liu, et al., "A 3.9 ps RMS Resolution Time-To-Digital Converter Using Dual-sampling Method on Kintex UltraScale FPGA," (2006), 2 pages.

Montemerlo, et al., "Junior: The Stanford Entry in the Urban Challenge," (2008), 31 pages.

(56) References Cited

OTHER PUBLICATIONS

Palka, et al., "A Novel Method Based Solely on FPGA Units Enabling Measurement of Time and Charge of Analog Signals in Positron Emission Tomography," (2014), 6 pages.
Raismian, "Google Cars Autonomous Driving," (2017), 1 pages.
Schwarze, "A New Look at Risley Prisms," (2006), 5 pages.
Tongtong, et al., "Gaussian-Process-Based Real-Time Ground Segmentation for Autonomous Land Vehicles," (2014), 25 pages.
Wu, et al., "Several Key Issues on Implementing Delay Line Based TDCs using FPGA," (2009), 6 pages.
International Searching Authority, International Search Report and the Written Opinion of the International Searching Authority, PCT Application PCT/CN2017/078611, dated Dec. 29, 2017, 12 pages.
International Searching Authority, "International Search Report and Written Opinion," PCT/CN2017/082604, dated Jan. 26, 2018., 11 pages.
Zhang et al., "Loam: Lidar Odometry and Mapping in Real-Time," Robotics Science and Systems., vol. 2., 2014.

\* cited by examiner

CALIBRATION OF LASER AND VISION SENSORS

CROSS REFERENCE TO RELATED APPLICATIONS

The present application is a continuation of International patent application No. PCT/CN17/82604, filed Apr. 28, 2017, which is incorporated herein by reference.

TECHNICAL FIELD

The present technology is generally directed to calibration between an emitter/detector sensor (e.g., a laser sensor) and an optical detection sensor (e.g., a vision sensor such as a camera) that are carried by a mobile platform.

BACKGROUND

The operations of mobile platforms are typically facilitated by obtaining position information of objects in a surrounding environment, using a combination of sensors. The information obtained regarding the positions of objects can facilitate the detecting pedestrians and/or vehicles in the environment, thereby allowing the mobile platforms to avoid obstacles during navigation. Typical optical detection sensors, such as monocular cameras, can detect an object based on computer vision and machine learning algorithms, but cannot consistently provide three-dimensional position information of the target. Emitter/detector sensors, such as LiDAR sensors, typically transmit a pulsed signal (e.g. laser signal) outwards, detect the pulsed signal reflections, and measure three-dimensional information (e.g., laser scanning points) in the environment to facilitate mapping the environment. Typical emitter/detector sensors can provide three-dimensional geometry information of the environment, but object detection based thereon is relatively difficult. Additionally, conventional omni-directional laser sensors with 360-degree horizontal field of view (FOV) can be expensive and non-customizable. Accordingly, there remains a need for improved sensing techniques and devices for mobile platforms.

SUMMARY

The following summary is provided for the convenience of the reader and identifies several representative embodiments of the disclosed technology.

In some embodiments, a computer-implemented method for automatically calibrating at least an emitter/detector unit and an optical detection unit, both carried by a common mobile platform, includes combining one or more sets of point information obtained from the emitter/detector unit to form a point cloud in a reference system associated with the mobile platform; selecting a subset of feature points from the point cloud; evaluating the subset of feature points with edge information obtained from the optical detection unit; and generating at least one calibration rule for calibration between the emitter/detector unit and the optical detection unit based at least in part on evaluating the feature points with the edge information. In some embodiments, the method further includes transforming the subset of feature points based at least in part on a set of transformation rules, which is at least partially defined in accordance with a position and orientation of the optical detection unit relative to the mobile platform. In some embodiments, the reference system associated with the mobile platform comprises a coordinate system. In some embodiments, the method further includes selecting the subset of feature points based at least in part on one or more depth differences between points within the point cloud based on a relationship between the one or more depth differences and a threshold value. In some embodiments, the method further includes converting an image obtained from the optical detection unit into a grayscale image; and determining the edge information based at least in part on a difference between at least one pixel of the grayscale image and one or more pixels within a threshold proximity of the at least one pixel. In some embodiments, evaluating the feature points with the edge information comprises projecting the feature points to respective positions in an image obtained from the optical detection unit. In some embodiments, evaluating the feature points with the edge information further comprises evaluating a target function defined at least in part by the projected positions of the feature points, wherein generating at least one calibration rule comprises optimizing the target function and wherein optimizing the target function comprises optimizing the target function in accordance with at least six degrees of freedom. In some embodiments, the at least one calibration rule includes a rule for transformation between a reference system associated with the emitter/detector unit and the reference system associated with the optical detection unit. In some embodiments, the method further includes detecting a difference between (a) the generated at least one calibration rule with (b) one or more previously generated calibration rules. In some embodiments, the method further includes causing calibration between the emitter/detector unit and the optical detection unit in accordance with the at least one calibration rule.

In some embodiments, a non-transitory computer-readable medium stores computer-executable instructions. The computer-executable instructions, when executed, cause one or more processors associated with a mobile platform to perform actions including combining one or more sets of point information obtained from an emitter/detector unit to form a point cloud in a reference system associated with the mobile platform; selecting a subset of feature points from the point cloud; evaluating the feature points with edge information obtained from the optical detection unit; and generating at least one calibration rule for calibration between the emitter/detector unit and the optical detection unit based at least in part on evaluating the feature points with the edge information. In some embodiments, the actions further include transforming the subset of feature points based at least in part on a set of transformation rules, which are at least partially defined in accordance with a position and orientation of the optical detection unit relative to the mobile platform. In some embodiments, the reference system associated with the mobile platform comprises a coordinate system. In some embodiments, the actions further include selecting the subset of feature points based at least in part on one or more depth differences between points within the point cloud based on a relationship between the one or more depth differences and a threshold value. In some embodiments, the actions further include converting an image obtained from the optical detection unit into a grayscale image; and determining the edge information based at least in part on a difference between at least one pixel of the grayscale image and one or more pixels within a threshold proximity of the at least one pixel. In some embodiments, evaluating the feature points with the edge information comprises projecting the feature points to respective positions in an image obtained from the optical detection unit. In some embodiments, evaluating the feature points with the edge information further comprises evaluating a target function defined at least in part by the projected positions of the feature points, wherein generating at least one calibration rule comprises optimizing the target function and wherein optimizing the target function comprises optimizing the target function in accordance with at least six degrees of freedom. In some embodiments, the at least one calibration rule includes a rule for transformation between a reference system associated with the emitter/detector unit and the reference system associated with the optical detection unit. In some embodiments, the actions further include detecting a difference between (a) the generated at least one calibration rule with (b) one or more previously generated calibration rules. In some embodiments, the actions further include causing calibration between the emitter/detector unit and the optical detection unit in accordance with the at least one calibration rule.

In some embodiments, a vehicle includes a programmed controller that at least partially controls one or more motions of the vehicle. The programmed controller includes one or more processors configured to combine temporally sequenced sets of point information obtained from a measurement unit to form a point cloud in a reference system associated with the vehicle; transform a subset of the point cloud into a plurality of feature points in a reference system associated with an optical detection unit; evaluate the feature points with edge information obtained from the optical detection unit; and generate at least one calibration rule for calibration between the measurement unit and the optical detection unit based at least in part on evaluating the feature points with the edge information. In some embodiments, transforming a subset of the point cloud is based at least in part on a set of transformation rules, which comprises a transformation matrix. In some embodiments, selecting the subset of the point cloud comprises selecting a portion of the subset of points based at least in part on one set of the temporally sequenced sets of point information. In some embodiments, the measurement unit comprises at least one laser sensor that has a field of view (FOV) smaller than at least one of 360 degrees, 180 degrees, 90 degrees, or 60 degrees. In some embodiments, the optical detection unit includes a monocular camera. In some embodiments, the one or more processors are further configured to convert an image obtained from the optical detection unit into a grayscale image and determine the edge information based at least in part on a difference between at least one pixel of the grayscale image and one or more pixels within a threshold proximity of the at least one pixel. In some embodiment, evaluating the feature points with the edge information comprises projecting the feature points to respective positions in an image obtained from the optical detection unit. In some embodiments, the vehicle corresponds to at least one of an unmanned aerial vehicle (UAV), a manned aircraft, an autonomous car, a self-balancing vehicle, or a robot.

In some embodiments, a computer-implemented method for generating a combined point cloud for a measurement unit carried by a mobile platform includes obtaining observation data generated from a plurality of observation sensors carried by the mobile platform, wherein the observation data corresponds to a time period; evaluating states associated with the measurement unit at different points in time within the time period based at least in part on the observation data; determining one or more transformation rules for transforming between reference systems associated with the measurement unit at different points in time within the time period to a target reference system associated with the measurement unit; transforming data obtained by the measurement unit at different points in time within the time period based at least in part on the one or more transformation rules; and generating the combined point cloud using at least a portion of the transformed data. In some embodiments, the measurement unit emits and detects signals. In some embodiments, the plurality of observation sensors comprises at least one of a stereo camera, an inertial measurement unit, a wheel encoder, or a global positioning system. In some embodiments, obtaining observation data comprises obtaining observation data at different rates from at least two different observation sensors. In some embodiments, the measurement unit has a different data acquisition rate than at least one observation sensor. In some embodiments, the states associated with the measurement unit is based on states associated with at least one observation sensor. In some embodiments, the states associated with the measurement unit include at least one of a position, speed, or rotation. In some embodiments, evaluating the states associated with the measurement unit comprises evaluating a probability model. In some embodiments, evaluating the states associated with the measurement unit further comprises evaluating the states based at least in part on Gaussian white noise. In some embodiments, evaluating the states associated with the measurement unit further comprises determining optimal values for the states associated with the measurement unit. In some embodiments, evaluating the states associated with measurement unit is based at least part on a maximum-a-posteriori method. In some embodiments, the time period includes a target point in time that corresponds to the target reference system, wherein the target point in time corresponds to an initial point of the time period. In some embodiments, transforming data obtained by the measurement unit at different points in time further comprises projecting at least a portion of the data obtained by the measurement unit in accordance with one or more transformation matrices.

In some embodiments, a non-transitory computer-readable medium stores computer-executable instructions. The computer-executable instructions, when executed, cause one or more processors associated with a mobile platform to perform actions including: obtaining observation data generated from a plurality of observation sensors carried by the mobile platform, wherein the observation data corresponds to a time period; evaluating states associated with a measurement unit at different points in time within the time period based at least in part on the observation data; determining one or more transformation rules for transforming between reference systems associated with the measurement unit at different points in time within the time period to a target reference system associated with the measurement unit; transforming data obtained by the measurement unit at different points in time within the time period based at least in part on the one or more transformation rules; and generating the combined point cloud using at least a portion of the transformed data. In some embodiments, the measurement unit measures at least one object by emitting and detecting one or more signals. In some embodiments, the plurality of observation sensors comprises at least one of a stereo camera, an inertial measurement unit, a wheel encoder, or a global positioning system. In some embodiments, obtaining observation data comprises obtaining observation data at different rates from at least two different observation sensors. In some embodiments, the measurement unit has a different data acquisition rate than at least one observation sensor. In some embodiments, the states associated with the measurement unit is based on states associated with at least one observation sensor. In some embodiments, the states associated with the measurement unit include at least one of a position, speed, or rotation. In some embodiments, evaluating the states associated with the measurement unit comprises evaluating a probability model. In some embodiments, evaluating the states associated with the measurement unit further comprises evaluating the states based at least in part on Gaussian white noise. In some embodiments, evaluating the states associated with the measurement unit further comprises determining optimal values for the states associated with the measurement unit. In some embodiments, evaluating the states associated with measurement unit is based at least part on a maximum-a-posteriori method. In some embodiments, the time period includes a target point in time that corresponds to the target reference system, wherein the target point in time corresponds to an initial point of the time period. In some embodiments, transforming data obtained by the measurement unit at different points in time further comprises projecting at least a portion of the data obtained by the measurement unit in accordance with one or more transformation matrices.

In some embodiments, a vehicle includes a programmed controller that at least partially controls one or more motions of the vehicle. The programmed controller includes one or more processors configured to obtain observation data generated from a plurality of observation sensors carried by the vehicle, wherein the observation data corresponds to a time period; evaluate states associated with a measurement unit at different points in time within the time period based at least in part on the observation data; determine one or more transformation rules for transforming between reference systems associated with the measurement unit at different points in time within the time period to a target reference system associated with the measurement unit; transform data obtained by the measurement unit at different points in time within the time period based at least in part on the one or more transformation rules; and generate the combined point cloud using at least a portion of the transformed data. In some embodiments, the plurality of observation sensors exclude the measurement unit. In some embodiments, the plurality of observation sensors comprises at least one of a stereo camera, an inertial measurement unit, a wheel encoder, or a global positioning system. In some embodiments, obtaining observation data comprises obtaining observation data at different rates from at least two different observation sensors. In some embodiments, the measurement unit has a different data acquisition rate than at least one observation sensor. In some embodiments, the states associated with the measurement unit is based on states associated with at least one observation sensor. In some embodiments, the states associated with the measurement unit include at least one of a position, speed, or rotation. In some embodiments, evaluating the states associated with the measurement unit comprises evaluating a probability model. In some embodiments, evaluating the states associated with the measurement unit further comprises evaluating the states based at least in part on Gaussian white noise. In some embodiments, evaluating the states associated with the measurement unit further comprises determining optimal values for the states associated with the measurement unit. In some embodiments, evaluating the states associated with measurement unit is based at least part on a maximum-a-posteriori method. In some embodiments, the time period includes a target point in time that corresponds to the target reference system, wherein the target point in time corresponds to an initial point of the time period. In some embodiments, transforming data obtained by the measurement unit at different points in time further comprises projecting at least a portion of the data obtained by the measurement unit in accordance with one or more transformation matrices.

DETAILED DESCRIPTION

1. Overview

Figure 1A:
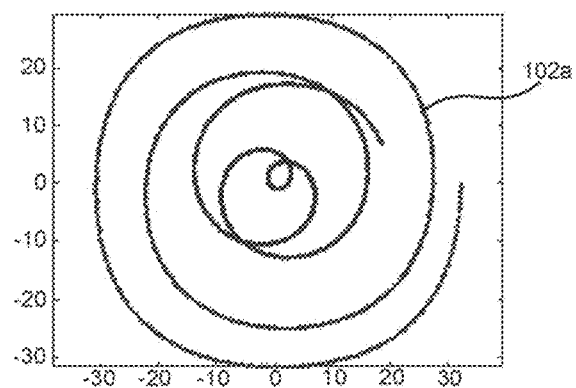
FIG. 1A illustrates a scanning pattern of a laser sensor that can be utilized in accordance with some embodiments of the presently disclosed technology.

To facilitate efficient and accurate object detection for mobile platforms while overcoming the deficiencies associated with omni-directional laser sensors, the presently disclosed technology is directed to calibrating emitter/detector sensor(s) (e.g., laser sensor(s) with a limited FOV) with optical detection sensor(s) to provide position information (including distance information) of objects in the environment surrounding of mobile platform. Laser sensors with a limited FOV (e.g., small-angle laser sensors) can be significantly cheaper than omni-directional laser sensors and as used herein typically refer to laser sensors with a horizontal field of view (FOV) smaller than 360 degrees, 180 degrees, 90 degrees, or 60 degrees.

Laser sensors with a limited FOV typically generate a more limited number of laser scanning points (and a sparser distribution of laser scanning points) than an omni-directional LiDAR. These factors may make it difficult to develop a stable corresponding relationship between the laser sensor and a camera. With respect to this problem, the presently disclosed technology can use an advanced visual inertial navigation technology in combination with sensors carried by the mobile platform to stably generate and/or update six-degrees-of-freedom transformation information (e.g., transformation matrix) for transforming between coordinate systems associated with the laser sensor and the camera, based on certain positioning information of the mobile platform body. Additionally, the disclosed technology can detect external interferences (e.g., external vibration and/or other disturbances during the deployment of the mobile platform) to the laser sensor and/or the camera based on changes to the calibrated transformation information. The disclosed technology can enable accurate calibration and interference detection in real time, further contributing to the reliability and safety of the mobile platform.

Several details describing structures and/or processes that are well-known and often associated with mobile platforms (e.g., UAVs or other types of movable objects) and corresponding systems and subsystems, but that may unnecessarily obscure some significant aspects of the presently disclosed technology, are not set forth in the following description for purposes of clarity. Moreover, although the following disclosure sets forth several embodiments of different aspects of the presently disclosed technology, several other embodiments can have different configurations or different components than those described herein. Accordingly, the presently disclosed technology may have other embodiments with additional elements and/or without several of the elements described below with reference to FIGS. 1-13.

FIGS. 1-13 are provided to illustrate representative embodiments of the presently disclosed technology. Unless provided for otherwise, the drawings are not intended to limit the scope of the claims in the present application.

Many embodiments of the technology described below may take the form of computer- or controller-executable instructions, including routines executed by a programmable computer or controller. The programmable computer or controller may or may not reside on a corresponding mobile platform. For example, the programmable computer or controller can be an onboard computer of the mobile platform, or a separate but dedicated computer associated with the mobile platform, or part of a network or cloud based computing service. Those skilled in the relevant art will appreciate that the technology can be practiced on computer or controller systems other than those shown and described below. The technology can be embodied in a special-purpose computer or data processor that is specifically programmed, configured or constructed to perform one or more of the computer-executable instructions described below. Accordingly, the terms "computer" and "controller" as generally used herein refer to any data processor and can include Internet appliances and handheld devices (including palmtop computers, wearable computers, cellular or mobile phones, multi-processor systems, processor-based or programmable consumer electronics, network computers, mini computers and the like). Information handled by these computers and controllers can be presented at any suitable display medium, including an LCD (liquid crystal display). Instructions for performing computer- or controller-executable tasks can be stored in or on any suitable computer-readable medium, including hardware, firmware or a combination of hardware and firmware. Instructions can be contained in any suitable memory device, including, for example, a flash drive, USB (universal serial bus) device, and/or other suitable medium.

2. Representative Embodiments

FIG. 1A illustrates a scanning pattern 102a of a laser sensor that can be utilized in accordance with some embodiments of the presently disclosed technology. As illustrated in FIG. 1A, the FOV of an example laser sensor is no larger than 60 degrees in both horizontal or vertical directions.

Figure 1B:
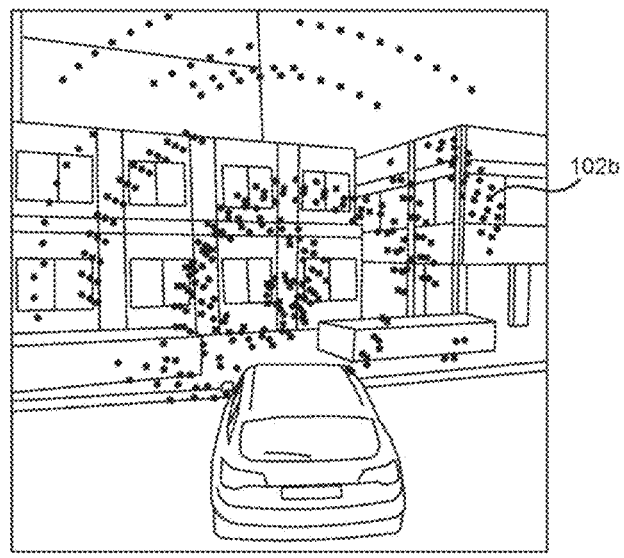
FIG. 1B illustrates a frontal view of a three-dimensional point cloud generated by a laser sensor, in accordance with some embodiments of the presently disclosed technology.

FIG. 1B illustrates a frontal view of a three-dimensional point cloud generated by a laser sensor (e.g., the laser sensor illustrated in FIG. 1A). Compared with a conventional omni-directional laser sensor that can provide a dense and uniformly- distributed, 360-degree three-dimensional point cloud (e.g., a single frame may provide at least 200,000 scanning points within 0.1 second), the illustrative laser sensor of FIG. 1B generates sparser point clouds (e.g., a single frame may provide only 2000 scanning points within 0.1 second), with non-uniform or uneven point distribution (e.g., points are relatively concentrated in the central region of the sensor's FOV and are relatively sparse in the peripheral regions of the sensor's FOV).

Figure 1C:
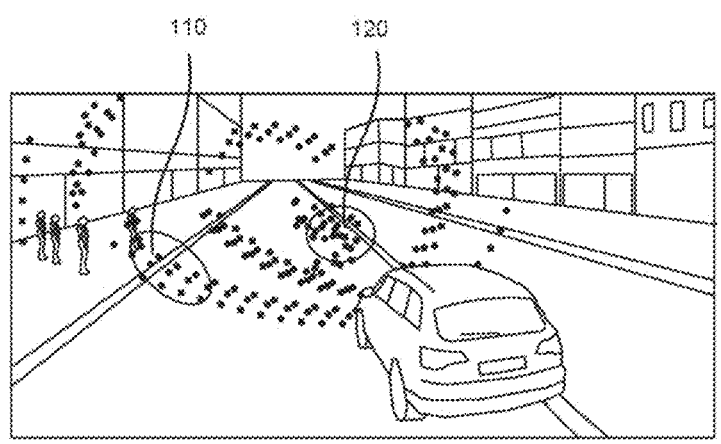
FIG. 1C illustrates an angled view of a three-dimensional point cloud generated by a laser sensor, in accordance with some embodiments of the presently disclosed technology.

FIG. 1C illustrates an angled view of a three-dimensional point cloud generated by a laser sensor (e.g., the laser sensor illustrated in FIG. 1A). As discussed earlier, (and unlike the uniform angular distribution of a laser beam generated by a typical omni-directional LiDAR), the distribution of laser scanning points generated by certain laser sensors can be non-uniform or uneven. Illustratively, with reference to FIG. 1C; the points are relatively sparse in a peripheral area 110, and are relatively dense in a frontal area 120.

Conventional methods for calibration between an omni-directional LiDAR and a monocular camera divide single frame LiDAR observation data (e.g., laser scanning data obtained within 0.1 second) into individual laser beams, and detect depth-discontinuous points (sometimes referred to herein as "feature points") on individual laser beams. However, applying these conventional methods to laser sensors with a limited FOV can be difficult, due to the point cloud characteristics discussed earlier with reference to FIGS. 1A to 1C (e.g., the non-uniform distribution and/or limited number of points in point cloud data).

The presently disclosed technology can use multiple sensors carried by the mobile platform, and can apply an advanced data fusion method to combine multiple frames of laser scanning data and establish dense point cloud information. The presently disclosed technology includes a new method for detecting feature points within point clouds, which can account for point cloud distribution characteristics of laser sensors with a limited FOV and planar distribution characteristics in an environment. In combination with methods for extracting edge information in an image, embodiments of the disclosed technology evaluate a match or correlation between the feature points and the edge information, for example, via an exhaustion based method, and generate calibration rules for calibrating, for example, between a laser sensor and a monocular camera.

Figure 2:
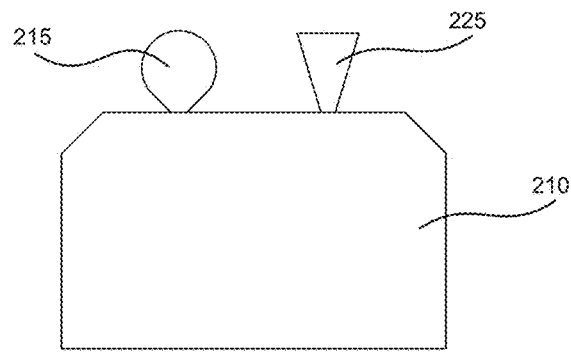
FIG. 2 illustrates a mobile platform with a laser sensor and an vision sensor in accordance with some embodiments of the presently disclosed technology.

FIG. 2 illustrates a mobile platform 210 with a laser sensor 215 (e.g., a small-angle LiDAR sensor) and a vision sensor 225 (e.g., a monocular camera) in accordance with some embodiments of the presently disclosed technology. The mobile platform, laser sensor and the vision sensor can be associated with respective coordinate systems. Hereinafter, $F^r$, $F^l$, and $F^c$ are used to represent coordinate systems of the mobile platform 210, the laser sensor 215, and the vision sensor 225, respectively. In some embodiments, the initial value $_rT_c$ of a transformation matrix between coordinate systems of the vision sensor 215 and the mobile platform 210, and the initial value $_rT_l$ of a transformation matrix between coordinate systems of the laser sensor 215 and the mobile platform 210 can be known or predetermined, for example, based on their relative position and orientation. Based on these, an initial value $_cT_l$ of a transformation matrix between the coordinate systems of the vision sensor 225 and the laser sensor 215 can be calculated.

Figure 3:
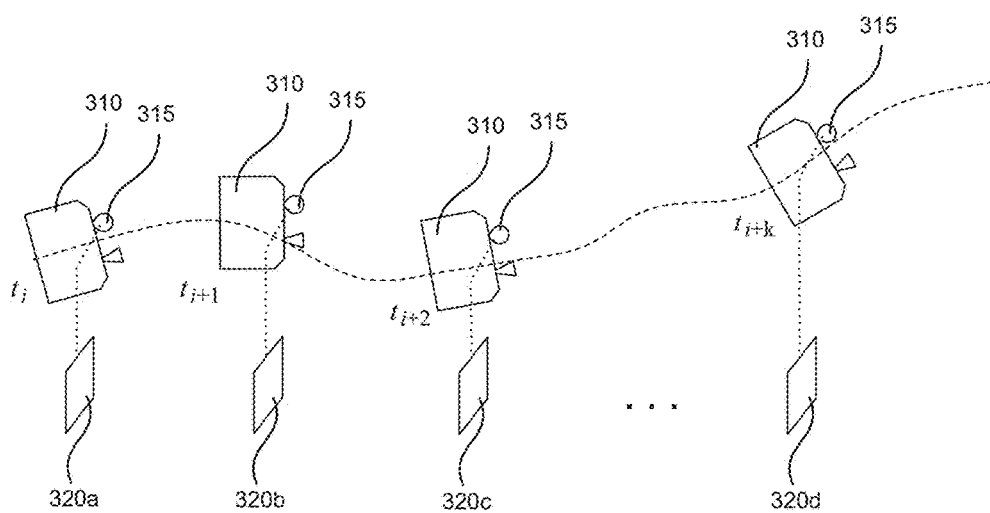
FIG. 3 illustrates a sequence of frames of scanning point data generated by a laser sensor that is carried by a mobile platform, which moves during a period of time, in accordance with some embodiments of the presently disclosed technology.

FIG. 3 illustrates a sequence of frames of scanning point data generated by a laser sensor 315 that is carried by a mobile platform 310, which moves during a period of time. As illustrated in FIG. 3, the laser sensor 315 (e.g., corresponding to the laser sensor 215 illustrated in FIG. 2) carried by the mobile platform 310 (e.g., corresponding to the mobile platform 210 illustrated in FIG. 2) generates multiple frames 320 of scanning point data during a time period from $t_i$ to $t_{i+k}$. For example, frame 320a is generated at time $t_i$ with the mobile platform 310 (and the laser sensor 315) situated in a first position/orientation, frame 320b is generated at a subsequent time $t_{i+1}$ with the mobile platform 310 (and the laser sensor 315) situated in a second position/orientation, and frame 320c is generated at a subsequent moment $t_{i+2}$ with the mobile platform 310 (and the laser sensor 315) situated in a third position/orientation. As will be discussed in detail below with reference to FIGS. 8-11, portions of the presently disclosed technology can generate a combined point cloud based on temporally sequenced sets of point data, such as the sequence of frames 320. Also, the relative position $T_{t_i}^r$ of the mobile platform 310 in a reference coordinate system at any point in time $t_i$ within the time period can be calculated based thereon.

Figure 4:
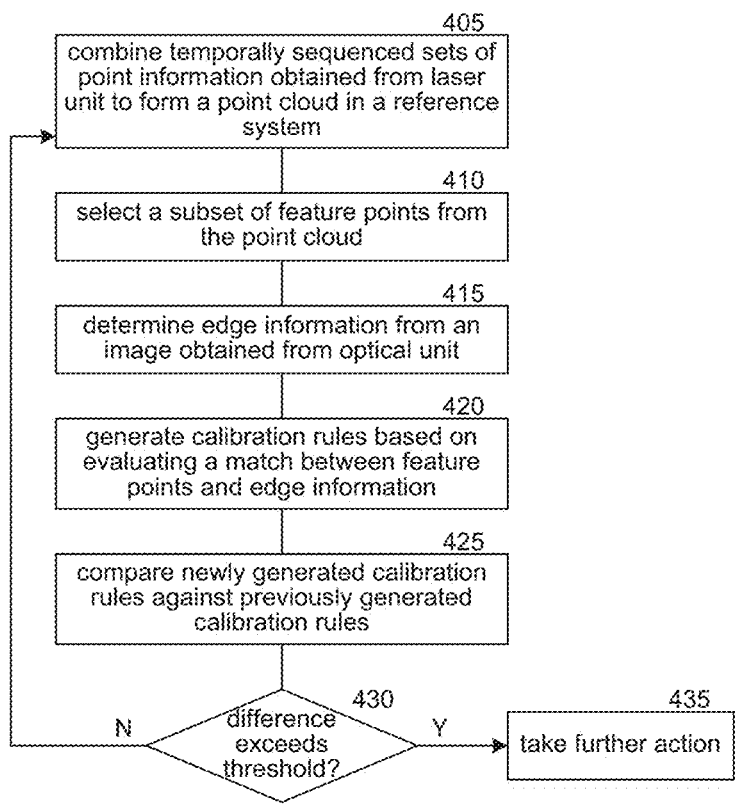
FIG. 4 illustrates a calibration process for calibration between a laser unit (e.g., including one or more laser sensors) and an vision unit (e.g., including one or more vision sensors) in accordance with some embodiments of the presently disclosed technology.

FIG. 4 illustrates a calibration process for calibration between a laser unit (e.g., including one or more laser sensors 215 illustrated in FIG. 2) and a vision unit (e.g., including one or more vision sensors 225 illustrated in FIG. 2) in accordance with some embodiments of the presently disclosed technology. The calibration process of FIG. 4 can be implemented by a controller (e.g., an onboard computer of a mobile platform, an associated computing device, and/or an associated computing service).

Figure 5:
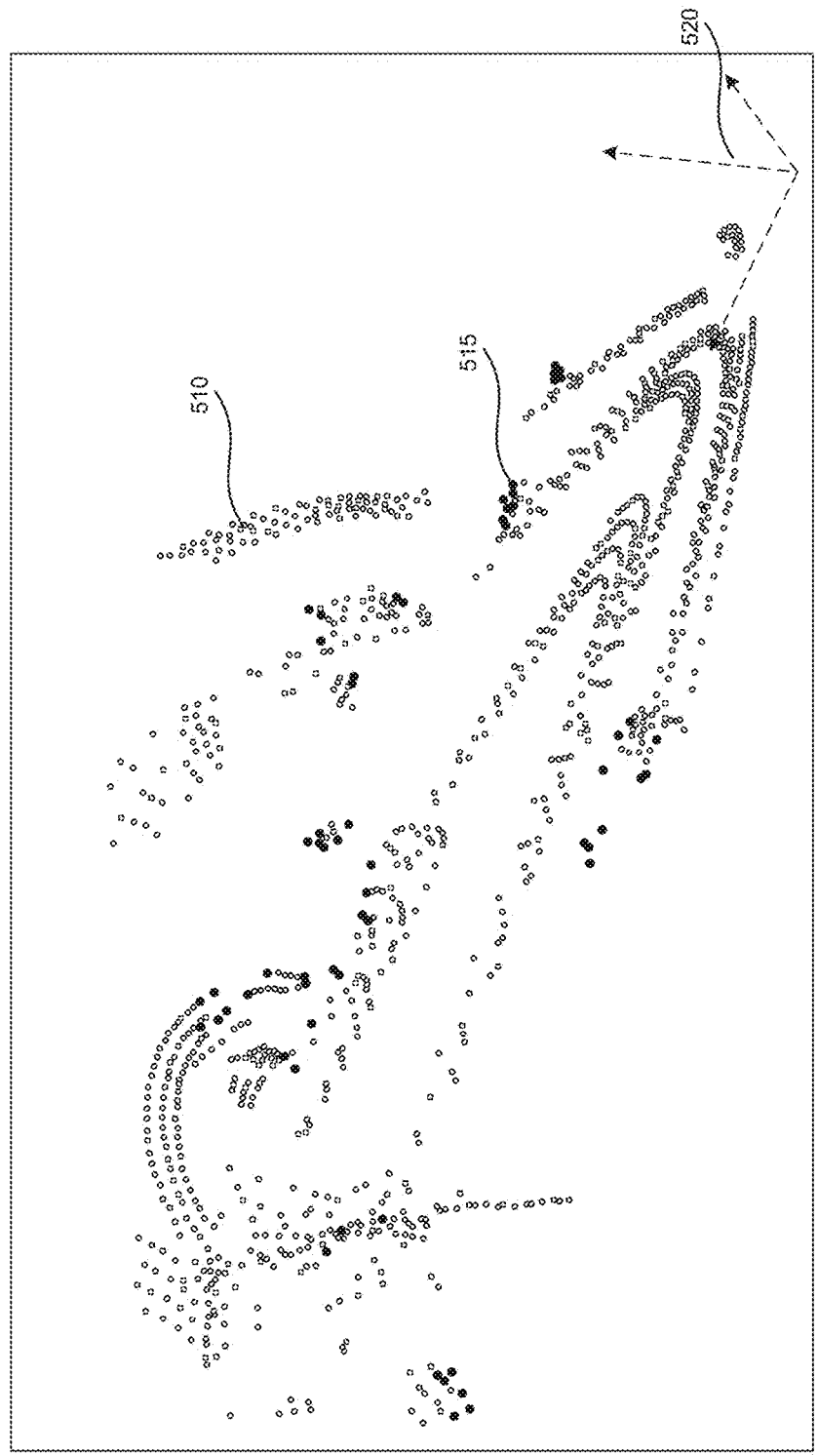
FIG. 5 illustrates one frame of laser scanning points produced by a laser unit in accordance with some embodiments of the presently disclosed technology.
Figure 6:
FIG. 6 illustrates a combined point cloud generated in accordance with some embodiments of the presently disclosed technology.

In step 405, the process includes combining temporally sequenced sets of point information obtained from the laser unit to form a point cloud in a reference system. For example, FIG. 5 illustrates one frame of laser scanning points 510 produced by the laser unit at a point in time (e.g., time $t_i$ as illustrated in FIG. 3), in accordance with some embodiments of the presently disclosed technology. Illustratively, individual scanning points within a frame may not be generated simultaneously. For example, in some embodiments, although laser sensor data (e.g., scanning points) is collected continuously, frames of scanning points are generated or transmitted in accordance with some discrete time intervals. In other words, a frame may correspond to a set of laser sensor data (e.g., scanning points) accumulated in a certain duration of time (e.g., 0.1 second). With reference to FIG. 5, illustratively a sparse set of laser scanning points 510 is distributed in a three-dimensional coordinate system 520 in a non-uniform manner. As discussed earlier, in some embodiments, the sparse and non-uniform distribution of points 510 may not provide enough data for the desired calibration between the laser unit and the vision unit. FIG. 6 illustrates a combined point cloud generated in accordance with some embodiments of the presently disclosed technology. As illustrated in FIG. 6, a dense set of laser scanning points 610 that combines multiple sets (e.g., 10 consecutive frames) of laser scanning points (e.g., similar to the set of points 510 in FIG. 5) is distributed in a three-dimensional coordinate system 620 in a relatively uniform manner to provide comprehensive three-dimensional environmental information.

Embodiments of the combining process will be discussed in further detail below with reference to FIGS. 8-11. To combine multiple frames of point data in a manner that reduces noise and/or errors, embodiments of the presently disclosed technology include estimating a relative transformation matrix between successive frames by using multiple types of sensors carried by the mobile platform.

In some embodiments, step 405 determines relative positions $T_{t_i}^r$, $T_{t_{i+1}}^r$, ..., $T_{t_{i+k}}^r$ of the mobile platform body at respective points in time with or without actually combining the multiple frames of scanning points. In these embodiments, feature points can be selected from each frame of point data and combined based on the relative positions $T_{t_i}^r$, $T_{t_{i+1}}^r$, ..., $T_{t_{i+k}}^r$. For example, given two relative positions $T_{t_i}^r$ and $T_{t_{i+1}}^r$, the controller can calculate transformation matrix $_{t_i}T_{t_{i+1}}^r$ for transforming between the mobile platform coordinate systems at times $t_i$ and $t_{i+1}$. Also using suitable default or initial transformation between coordinate systems of the laser unit and the mobile platform, the controller can align feature points in frames of different times in a mobile platform coordinate system at a particular time (e.g., $t_i$).

In step 410, the calibration process includes selecting a subset of feature points from the point cloud. Illustratively, feature points can be identified in multiple frames of scanning points. In addition to a depth difference between neighboring or continuous points, the presently disclosed technology can account for at least two aspects:

1) as distance in depth increases, laser scanning points become sparser, and thus the distance between two neighboring or continuous points increases; and
2) as laser scanning points approach the periphery of the FOV (e.g., an angle between the laser beam line and the laser unit orientation (e.g., laser unit main axis) becomes larger), distance between two neighboring points increases.

Based on the above, the process can include calculating the greater distance between two pairs of neighboring or continuous points in individual frames according to the following formula:

$$d_i = \max(|p_i - p_{i+1}|, |p_i - p_{i+1}|)$$

wherein $|p_i - p_{i+1}|$ denotes a distance between two points i and i+1. Then, the controller determines two scaling parameters:

$$\varepsilon_d \propto z_i \text{ and}$$

$$\varepsilon_y \propto \arccos\left(\frac{p_i \cdot n}{|p_i||n|}\right).$$

The first parameter $\varepsilon_d$ is proportional to the z-direction distance to a point (e.g., along the laser beam axis), and the second parameter $\varepsilon_y$ is proportional to an angle between a corresponding laser beam and the laser unit orientation n. The controller can calculate a normalized depth-discontinuous value $$\bar{d}_i = \frac{d_i}{\varepsilon_d \varepsilon_y},$$

which can be compared to a threshold to filter out those values that are smaller than the threshold. In this manner, the controller identifies feature points (that correspond relatively large normalized values $\bar{d}_i$) from a frame of points. Illustratively, black solid points 515 represent a subset of feature points identified from scanning points 510 in the frame of FIG. 5. In some embodiments, this selecting process can be applied to a combined point cloud if it is generated in step 405. Illustratively, black points 615 represent a subset of feature points identified from a combined point cloud 610 of FIG. 6.

According to (1) the known transformation initial value $_rT_l$ for transforming between coordinate systems of the mobile platform and the laser unit, and (2) relative positions $T_{t_i}^r, T_{t_{i+1}}^r, \ldots, T_{t_{i+k}}^r$ of the mobile platform body at respective points in time (e.g., as determined in step 405 or calculated by an associated attitude estimation unit), the controller can project feature points identified from frames at different points in time into an initial mobile platform coordinate system $F_{t_i}^r$ that corresponds to time $t_i$, i.e., the beginning moment of a time period from $t_i$ to $t_{i+k}$). Depending on the orientation of the initial mobile platform coordinate system $F_{t_i}^r$, the projected feature points from multiple frames can appear similar to the black points 615 illustrated in FIG. 6.

The controller can then determine a position of the vision unit relative to the initial mobile platform coordinate system $F_{t_i}^r$ based on (1) the relative positions $T_{t_i}^r, T_{t_{i+1}}^r, \ldots, T_{t_{i+k}}^r$ of the mobile platform body and (2) the initial value $_rT_c$ of transformation matrix between coordinate systems of the vision unit and the mobile platform, and project the feature points into coordinate systems of the vision unit at different points in time.

Figure 7A:
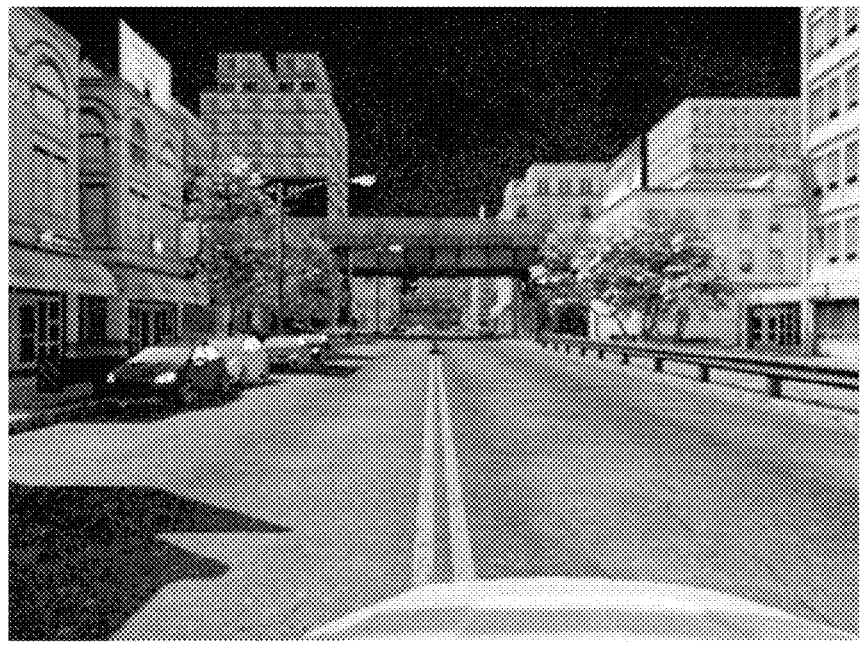
FIG. 7A illustrates a grayscale image that is captured or otherwise obtained from a vision unit, in accordance with some embodiments of the presently disclosed technology.

In step 415, the calibration process includes deriving edge information from one or more image(s) obtained from the vision unit. Illustratively, the vision unit captures color images (which can be converted to corresponding grayscale images) or grayscale images at different times from $t_i$ to $t_{i+k}$. For example, FIG. 7A illustrates a grayscale image that is captured or otherwise obtained from the vision unit, in accordance with some embodiments of the presently disclosed technology.

Figure 7B:
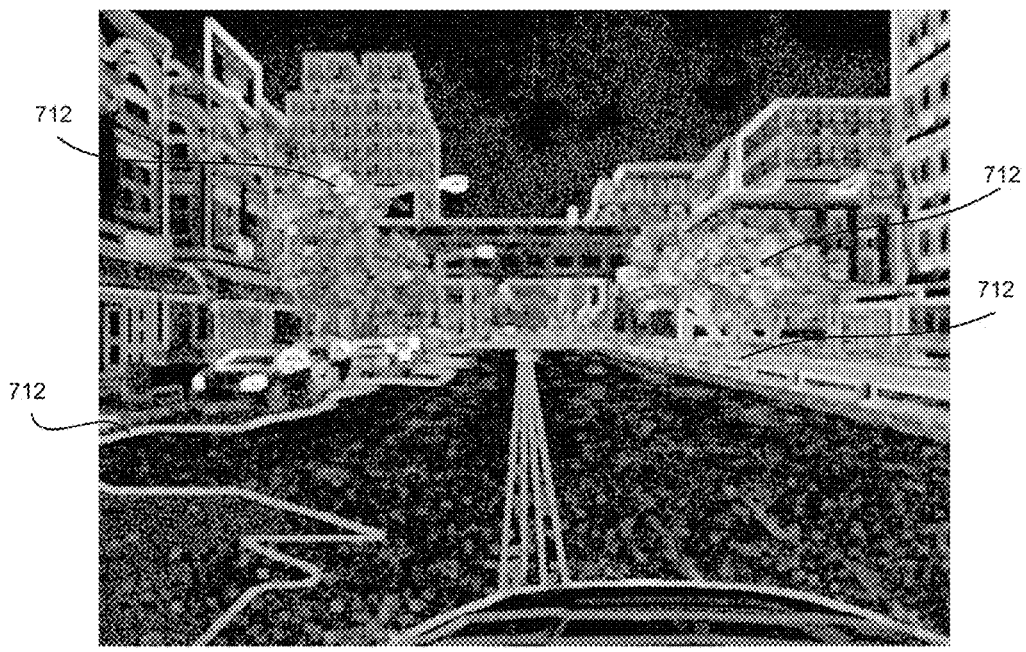
FIG. 7B illustrates an edge image that can be determined from the grayscale image of FIG. 7A, in accordance with some embodiments of the presently disclosed technology.

For each grayscale image captured at a particular point in time, the controller derives edge information. In some embodiments, for each pixel of the image, the controller determines the maximum difference between the grayscale values of the pixel and any of its neighboring pixels (e.g., within a threshold proximity) in accordance with the following formula:

$$e_{i,j} = \max_{g_{m,n} \in G} |g_{i,j} - g_{m,n}|$$

wherein G denotes a neighborhood area around $g_{i,j}$. An edge image E indicating all $e_{i,j}$ values can be generated to describe edge information derived from a corresponding image. In some embodiments, the controller may optionally smooth the image E to help improve the matching between edge information and feature points in the following step. FIG. 7B illustrates an edge image E that can be determined from the grayscale image of FIG. 7A, in accordance with some embodiments of the presently disclosed technology. Representative edges 712 (in lighter tone) are identified in FIG. 7B.

Those of skill in the relevant art may use other suitable edge detection techniques to obtain edge information from the vision unit. Additionally, the extraction of edge information can be performed via associated GPU parallelism, so that the image can be divided into blocks for parallel processing to quickly extract the edge information.

Figure 7C:
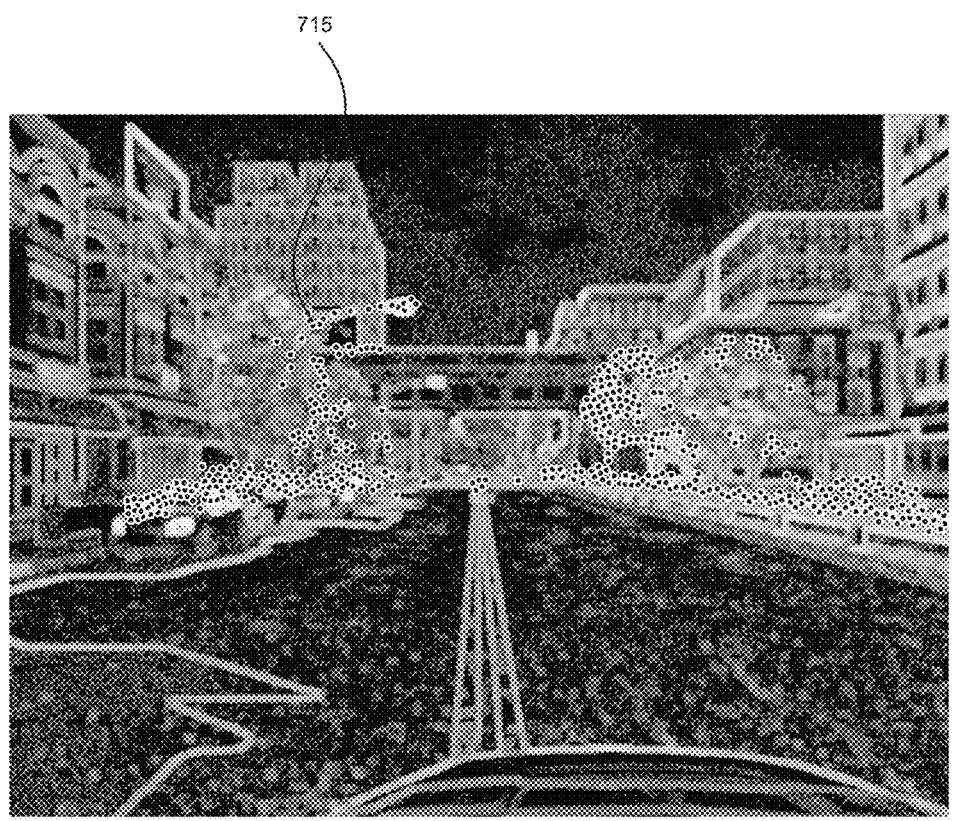
FIG. 7C illustrates a position set (projections of feature points 615 of FIG. 6) in the edge image of FIG. 7B, in accordance with some embodiments of the presently disclosed technology.

In step 420, the calibration process includes generating calibration rules based on evaluating a match between feature points and edge information. Illustratively, based on (a) relative positions $_rT_c$, $x=t_i, \ldots, t_{i+k}$ of the vision unit at different times and (b) corresponding internal parameters, the controller can project feature points in the feature point subset $P^f$ that is obtained in step 410 onto individual edge images $E_i, \ldots, E_{i+k}$ obtained in step 415. The projection can produce a position set $p^f$ of two-dimensional points (corresponding to the three-dimensional feature points) in a respective edge image. For example, FIG. 7C illustrates a position set 715 (a projection of feature points 615 of FIG. 6) in the edge image of FIG. 7B, in accordance with some embodiments of the presently disclosed technology.

With respect to each point $p_j^f \in p^f$, where $p_j^f = [u_j^f, v_j^f]$, the controller can identify an edge value $e_{u_j^f, v_j^f}$ of the pixel in the corresponding edge image $E_i$. Based on the normalized depth-discontinuous value $\bar{d}_j$ for each feature point as calculated in step 410, the controller can evaluate the following target function:

$$V = \sum_{i=1,2,\ldots,k} \sum_{j=1,2,\ldots,n} f(e_{i,j}, \bar{d}_j)$$

wherein i denotes an index of an image obtained by the vision unit, k denotes the number of images in a time period (e.g., a time-domain window $W_t$ of 10 or 20 seconds), j denotes an index of a feature point, and n denotes the number of points in the feature point subset $P^f$, $e_{i,j}$ denotes an edge value of a pixel (corresponding to a projection of feature point j) in image i, and $\bar{d}_j$ denotes a normalized depth-discontinuous value of a feature point j. In some embodiments, $f(e_{i,j}, \bar{d}_j)$ can be defined as $e_{i,j} \cdot \bar{d}_j$. In various embodiments, edge points in an image correspond to depth-discontinuous points in a corresponding three-dimensional space, therefore a higher value of V indicates a more accurate calibration between the laser unit and the camera unit.

To generate calibration rules (e.g., transformation matrix $_cT_l$ for transforming between coordinate systems of the vision unit and the laser unit), the controller can implement an exhaustion based method. On the basis of a given initial value $_cT_l$ for the transformation matrix, the controller may generate a set of m transformation matrices $$\tau = \{\tau_1, \tau_2, \ldots, \tau_m\}$$

by introducing disturbances such that $\tau_i = {}_cT_l \cdot \Delta T_i$, where $\Delta T_i$ can be a randomly generated disturbance factor within a threshold. In some embodiments, the transformation matrix has six degrees of freedom, therefore τ can generally be calculated by adding randomized noise to a translation vector [$t_x$, $t_y$, $t_z$] and an Eulerian angle [α, β, γ], respectively. In some embodiments, this approach uses an initial value $_cT_l$ that is not too far away (e.g. within a threshold proximity) from the truth value $_cT_l$, that is, the truth value is in a neighborhood of a parameter space where the initial value is located.

For each $τ_i$ value, the controller can calculate a respective value $V_i$ of the target function. Among all transformation matrices in the set τ, the controller can select a transformation matrix $τ_i$ corresponding to a maximum value $V_{max}$ to be $_cT_l$. In some embodiments, the controller can calibrate the laser unit with the vision unit based on the generated calibration rules. For example, the controller may use the determined transformation matrix $_cT_l$ to correlate (a) scanning points data generated by the laser unit with (2) image data (such as pixels) generated by the vision unit.

In some embodiments, noise in the observation data may cause the target function value to appear smaller when evaluated with the truth value $_cT_l$ than with certain non-truth values. This situation may be more apparent if the time-domain window is relatively short (e.g., a time period limited to include only one or two frames of image generated by the vision unit). To mitigate this problem, the presently disclosed technology can include using a longer time-domain window (e.g., a time period to include tens or hundreds of frames of image generated by the vision unit) in order to select an optimal transformation matrix $_cT_l$. A longer time-domain window may enhance the robustness of the calibration process and possibly avoid local maximum issues.

In step 425, the calibration process includes comparing newly generated calibration rules against previously generated calibrations rules. Generally speaking, the laser unit and the vision unit are both fixed to the mobile platform body during its movement. Under usual circumstances, $_cT_l$ may not change substantially and/or abruptly, but may change slightly due to vibrations. $_cT_l$ may change substantially and/or abruptly when the mobile platform and/or the units receive some significant external impact.

The controller can compare a newly determined transformation matrix $_cT_l$ against those determined in an initial round of calibration, a most recent round of calibration, an average or weighted average of several recent rounds, or the like. In some embodiments, the calibration process uses a sliding time-domain window method to detect, within the sliding time-domain window, whether a currently determined optimal $_cT_l$ is evidently different (e.g., with respect to a threshold) from the truth value(s) estimated previously.

In step 430, the calibration process includes determining whether the difference that results from the comparison in step 425 exceeds a threshold. If not, the process proceeds to step 405 for a new round of calibration. If the difference exceeds the threshold, the process proceeds to step 435.

In step 435, the calibration process includes taking one or more further actions. The difference exceeding the threshold may indicate that the laser unit and the vision unit cannot be reliably calibrated with each other. For example, the physical position or orientation of at least one of the two units may have deviated substantially from a preset configuration. In this case, the controller may issue a warning to an operator of the mobile platform. Alternatively, the controller may suspend the navigation or other functions of the mobile platform in a safe manner.

As discussed earlier, in the use of certain laser units or sensors, the number and/or distribution of laser scanning points in a single frame may not provide a sufficiently dense point cloud to facilitate calibration, mapping, object detection, and/or positioning. This problem may be particularly apparent in the use of low-cost small-angle LiDAR sensors. For example, for a typical low-cost small-angle LiDAR, the number of laser points in a single frame is usually limited to be fewer than 4000 or even 2000, whereas a more expensive omni-directional LiDAR may produce 288000 laser scanning points in a single frame. To combine multiple frames of point data in a manner that reduces noise and error, the presently disclosed technology includes estimating a relative transformation matrix between successive frames by using multiple types of sensors carried by a mobile platform.

Figure 8:
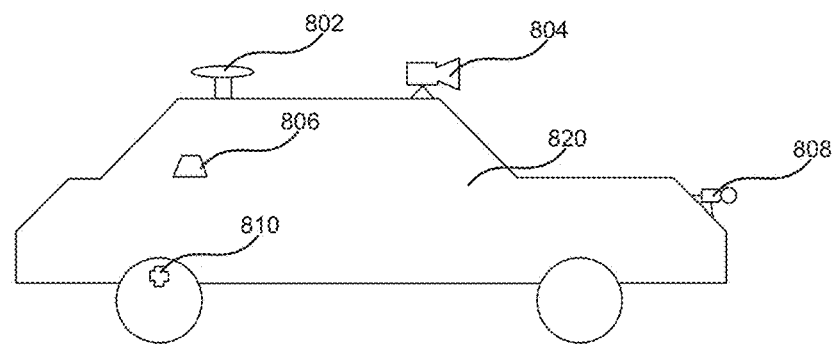
FIG. 8 illustrates a mobile platform that carries multiple sensors in addition to a laser unit (or laser sensor), in accordance with some embodiments of the presently disclosed technology.

FIG. 8 illustrates a mobile platform 820 that carries multiple sensors in addition to a laser unit (or sensor), in accordance with some embodiments of the presently disclosed technology. As illustrated, the mobile platform 820 may carry a stereo camera 804, an inertial measurement unit 806, a wheel encoder 810, and/or a global positioning system (GPS) 802, in addition to a laser unit 808. Those of skill in the relevant art will appreciate that fewer, more, or alternative sensors may be used by the presently disclosed technology. For example, instead of using the stereo camera 804, a set, array, or system of multiple cameras can be used.

Figure 9:
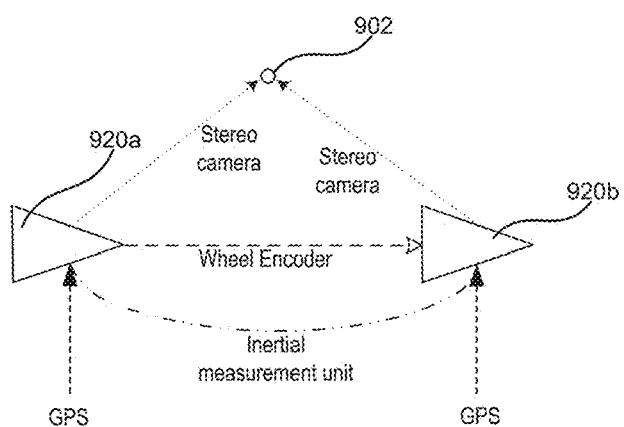
FIG. 9 illustrates information that can be provided by the multiple sensors of FIG. 8, in accordance with some embodiments of the presently disclosed technology.

FIG. 9 illustrates information that can be provided by the multiple sensors of FIG. 8, in accordance with some embodiments of the presently disclosed technology. The stereo camera 804 can provide three-dimensional coordinates of environmental features 902 (e.g., one or more distinctive points in three dimensional space of surrounding environment), which may establish a constraint relationship between successive frames (e.g., corresponding to observations from two different positions 920a and 920b). Illustratively, the sampling frequency or data acquisition rate of the stereo camera 804 is between 20 Hz and 40 Hz. The inertial measurement unit 806 can provide high-frequency acceleration information and angular velocity information. Illustratively, the sampling frequency or data acquisition rate of the inertial measurement unit is 200 Hz or higher. Via integration, a transformation matrix of the mobile platform 820 between two successive frames can be calculated. The wheel encoder 810 can provide the rotation speed of the powered wheels (e.g., rear wheels) and steering information of the front wheels, and can provide, according to a known wheel size, constraints on forward speeds and deflection angles between successive frames. Illustratively, the sampling frequency or data acquisition rate of the wheel encoder is about 20 Hz. Depending on outdoor signal conditions, the GPS 802 can provide the position of the mobile platform 820 and attitude information thereof in global system. Illustratively, the sampling frequency or data acquisition rate of the GPS is below 5 Hz. Illustratively, the laser unit 808 (e.g., including one or more LiDAR sensors) has a sampling frequency or data acquisition rate of 10 Hz.

The table below summarizes typical data acquisition frequency information of the representative sensors illustrated in FIGS. 8 and 9:

| Sensor | Frequency |
| --- | --- |
| Laser | 10 hz |
| Stereo camera | 20 hz to 40 hz |
| Inertial measurement unit | >200 hz |
| Wheel encoder | approximately 20 hz |
| Global positioning system | 5 hz |

Figure 10:
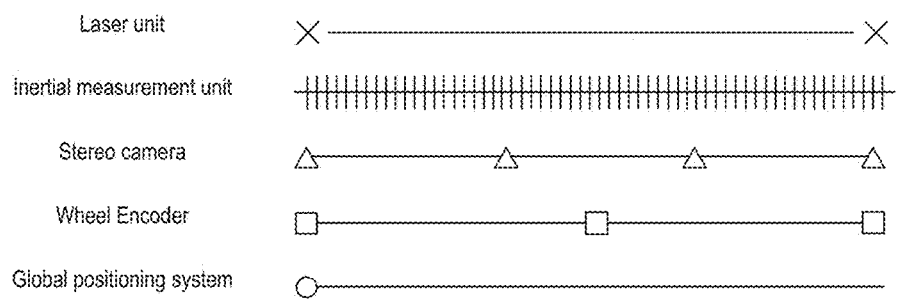
FIG. 10 illustrates data collection frequency differences of the multiple sensors and the laser unit of FIG. 8, in accordance with some embodiments of the presently disclosed technology.

FIG. 10 illustrates data collection frequency differences of the multiple sensors and the laser unit of FIG. 8, in accordance with some embodiments of the presently disclosed technology.

Figure 11:
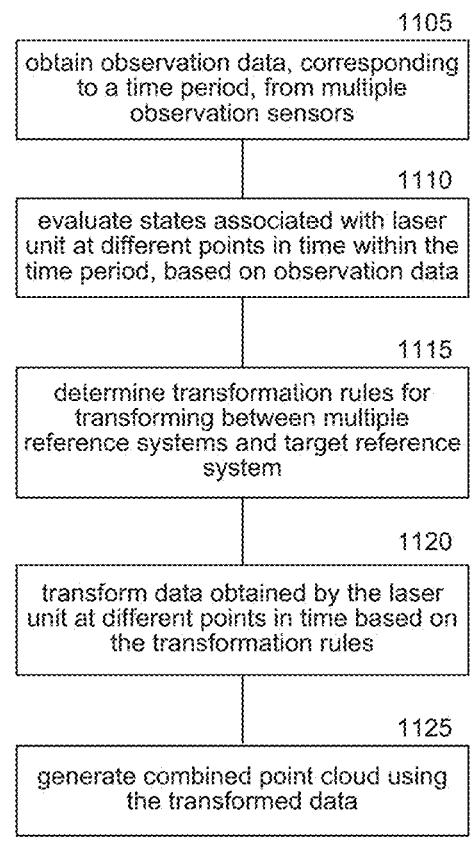
FIG. 11 illustrates a process for combining time sequenced point information to form a point cloud in accordance with some embodiments of the presently disclosed technology.

FIG. 11 illustrates a process for combining time sequenced point information generated by a laser unit to form a point cloud in accordance with some embodiments of the presently disclosed technology. The process can be implemented by a controller (e.g., an onboard computer of a mobile platform, an associated computing device, and/or an associated computing service). As part of the presently disclosed technology, generating a combined point cloud can include estimating relative states associated with the laser unit over a period of time, instead of estimating all subsequent states with respect to a global coordinate system. Illustratively, embodiments of the presently disclosed technology estimate relative position information of the laser unit with respect to two or more different frames that it generates in the period of time, thereby enabling accurate accumulation of laser point data from different frames in this period of time. This approach can facilitate or enhance subsequent calibration, object detection, mapping, and/or positioning operations.

Step 1105 of the process includes obtaining observation data, corresponding to a period of time, from multiple observation sensors (e.g., the multiple sensors as illustrated in FIG. 8). In some embodiments, methods in accordance with the presently disclosed technology may make an approximate case that observation data from different sensors is synchronized. For example, in a representative case, the data acquisition frequency of the target laser unit is 10 Hz, the frequency of the stereo camera is 40 Hz, the frequency of the wheel encoder is 20 Hz, the frequency of the inertial measurement unit is 200 Hz, and the frequency of the GPS is 5 Hz. As an approximation, observation data from different sensors can be considered as accurately aligned according to different frequency multiples. Accordingly, using a 1-second time window as an example, the controller can obtain 200 accelerometer and gyroscope readings (from the inertial measurement unit), 40 frames of stereo camera observation, 20 groups of speed and deflection angle observations (from the wheel encoder), and 5 pieces of GPS positioning information. Based on these, embodiments of the presently disclosed technology can estimate relative positions between 10 laser unit data acquisition events or positions thereof with respect to a particular local coordinate system (such as a local coordinate system corresponding to the first of the 10 data acquisition events).

In some embodiments, the presently disclosed technology includes a further approximation that the position of the laser unit coincides with that of the stereo camera, thereby further simplifying the problem to be solved. As discussed with reference to FIG. 9, the observation data from the different sensors can be described mathematically as follows:

1) According to the observation data from the stereo camera, illustratively three-dimensional coordinates and/or descriptor(s) of one or more environmental features (e.g., feature 902) can be extracted from frames produced by the camera at positions 920a and 920b, respectively. These coordinates and/or descriptor(s) can be matched with respect to the feature 902. In an objective function for optimization, this type of observation can be embodied by an error item relating to the re-projection of feature(s) onto the camera coordinate systems at different positions. For example, the cost term based on an environment feature and two consecutive frames of stereo camera observation includes 3 parts: (a) a re-projection error between the left camera and right camera at a frame corresponding to position 920a; (b) a re-projection error between the left camera and right camera at a frame corresponding to position 920b; and (c) a re-projection error between the left (or right) camera at two positions 920a and 920b.

2) According to the observation data from the inertial measurement unit with known timestamp and initial values, a constraint relationship of a rotation matrix, a translation vector, and a speed between two consecutive camera frames can be calculated, for example, by using suitable integration techniques known to those of skill in the relevant art. This type of observation can be embodied by an error item between the post-integration state and a real state in the objective function. Illustratively, the variables to be estimated at each frame, e.g., camera frames corresponding to positions 920a and 920b, include the camera's orientation (e.g., an element in Special Orthogonal group), and position and velocity (e.g., elements in $R^3$ space group.) Integration using observations captured from the inertial measurement unit provides the constraints between the variables explained above. In some embodiments, while a state is optimized iteratively, suitable pre-integration technique is adopted to improve computational efficiency.

3) A motion model including the speed and deflection angle of the mobile platform can be derived based on observation data from the wheel encoder. Similarly, via integration, a state constraint between consecutive camera frames can be obtained, and the expression of this type of observation can be similar to that of the inertial measurement unit. In some embodiments, in contrast to the situation of the inertial measurement unit, only a subspace of the state is constrained (e.g., the position and the yaw angle of the mobile platform) based on the wheel odometer observations. Due to possible noise of the wheel encoder, the covariance of this error term can be set to be relatively larger in some embodiments.

4) The observation data from the GPS can directly provide a constraint on a state of the mobile platform at a particular time. In the objective function, this type of observation can be expressed as an error between an estimated state provided by the GPS and a real state value. Due to the low data acquisition frequency of the GPS in some embodiments, the GPS observation may only be used when its noise level lower than certain threshold and/or its accuracy guaranteed within certain range.

In embodiments for which the position of the laser unit is approximately coinciding with that of the stereo camera, a controller (e.g., an onboard computer of the mobile platform, an associated computing device, and/or an associated computing service) obtains observation data that can be provided by the sensors for a period of time from time 1 until time k. The observation data can be expressed as follows:

$$Z_k = \{C_{1:k}, I_{1:k-1}, W_{1:p}, G_{1:q}\}$$

where 1) the first element $C_{1:k}$ denotes observation information obtained by the stereo camera, and may be defined as follows:

$$C_i = \{z_{i,1}, z_{i,2}, \ldots, z_{i,J}\}$$

where $z_{i,1}$ denotes an observation of a $j^{th}$ feature in the $i^{th}$ frame by the stereo camera;

2) the second element $I_{1:k-1}$ denotes a set of data acquired by the inertial measurement unit until the $k^{th}$ point in time, where $I_i = \{I_i, I_{i+1}, I_{i+2}, \ldots, I_{i+}\}$ denotes a set of all observations by the inertial measurement unit between the $i^{th}$ frame produced by the camera and the $i+1^{th}$ frame produced by camera (e.g., a total of 20 readings from the inertial measurement unit between 2 successive camera observations);

3) the third element $W_{l:p}$ denotes the observation by the wheel encoder, which may be expressed as follows:

$$W_{i,j} = [v_{i,j}^w, q_{i,j}^w]$$

where $v_{i,j}^w$ denotes speed information obtained by the wheel encoder at the $i^{th}$ point in time and the $j^{th}$ point in time and $q_{i,j}^w$ denotes a rotation transformation (e.g., quaternion expression), which can be derived or otherwise obtained by a deflection angle calculation, between the $i^{th}$ point in time and the $j^{th}$ point in time; and 4) the last element $G_{l:q}$ expresses the observation obtained by the GPS:

$$G_i = [p_i^G, q_i^G]$$

where $p_i^G$ denotes a global position of the $i^{th}$ point in time, and $q_i^G$ denotes rotation with respect to a global coordinate system.

Step 1110 of the process includes evaluating states associated with the laser unit at different points in time within the time period based on the observation data. Using a factor graph, the controller may establish a relationship between an a priori probability and an a posteriori probability associated with states $$X_k = \{x_k\}_{k=1}, \ldots, m$$

of the laser unit (coincident with the stereo camera):

$$p(X_k | Z_k) \propto p(X_0)p(Z_k | X_k) = p(X_0)$$
$$\prod_{i \in k-1} p(I_i | x_i, x_{i+1}) \prod_{i,j \in k} p(W_{i,j} | x_i, x_j) \prod_{i \in m} p(G_i | x_i) \prod_{i \in k} \prod_{l \in C_i} p(z_{i,l} | x_i)$$

where $k=[1,2,\ldots,k]$ denotes a set of observation indexes of the camera, m denotes a set of observation indices of the GPS, and a state of the laser unit can be expressed as:

$$x_k = [p_k, v_k, q_k]$$

where $x_k = p_k$, $v_k$, and $q_k$ respectively denote a position, a speed, and a quaternion (rotation) of the laser unit with respect to a particular coordinate system at the $k^{th}$ point in time. In the above formula, each p() is called a factor of the factor graph.

In some embodiments, using a mathematical derivation based on an assumption of zero-mean Gaussian white noise, the controller may compute a maximum-a-posteriori of the above factor graph based formula by solving for a minimum of the following formula:

$$X_k^* = \underset{X_k}{\operatorname{argmin}} - \log p(X_k | Z_k) = \underset{X_k}{\operatorname{argmin}} \|r_0\|_{\Sigma_0}^2 + \sum_{i \in k-1} \|r_{I_i}\|_{\Sigma_{I_i}}^2 + \sum_{i,j \in k} \|r_{W_{i,j}}\|_{\Sigma_{W_{i,j}}}^2 + \sum_{i \in m} \|r_{G_i}\|_{\Sigma_{G_i}}^2 + \sum_{i \in k} \sum_{l \in C_i} \|r_{C_{i,j}}\|_{\Sigma_{C_{i,j}}}^2$$

where $r_*$ represents different residual types, and $\Sigma_*$ denotes covariance matrices corresponding to different types of residuals, and is used to describe the uncertainty of the observation. In this regard, those of skill in the relevant art can determine residual models for different sensors and determine Jacobian matrices between optimization iterations. The controller can calculate optimal values for the laser unit states based on the minimization, for example, based on a gradient-based optimization method.

Step 1115 of the process includes determining transformation rules for transforming between multiple reference systems (e.g., at different points in time) and a target reference system. Illustratively, according to the following approximations: (1) the positions of the stereo camera and laser unit coincide with each other; and (2) timestamps of data acquired by the laser unit and data acquired by the camera are exactly the same, the controller can compute relative transformation matrices for the laser unit at different points in time with respect to a target point in time (i.e., when the subject period of time starts, half-way through the subject time period, or when the subject period of time ends) using corresponding states as determined.

In some embodiments, the approximations that (1) the positions of the stereo camera and laser unit coincide with each other; and (2) timestamps of data acquired by the laser unit and data acquired by the camera are exactly the same are not used. In these embodiments, the presently disclosed technology can account for two factors: (1) relative changes (e.g., the transformation matrix $_cT_l$ between the stereo camera and the laser unit; and (2) a timestamp difference between different sensors. Regarding the first factor (1), because the laser unit and the stereo camera are not likely to move relative to each other during the subject period of time, the controller may calculate a relative position of the laser unit at any $q^{th}$ point in time with respect to any $p^{th}$ point in time during the subject time period by simply calculating a relative position of the camera at time q with time p. As for the second factor (2) where timestamps between different sensors cannot be perfectly synchronized, the controller may use interpolation (e.g., based on a polynomial fitting) to compute relative position information in a coordinate system (e.g., a coordinate system of the mobile platform) at the time of any specified timestamp.

Step 1120 of the process includes transforming data obtained by the laser unit at different points in time based on the transformation rules. Illustratively, using the relative transformation matrices as determined in step 1115, the controller can re-project data (e.g., laser scanning points) acquired at different points in time (e.g., different frames) in the subject time period, to the target point in time. In some embodiments, the controller can exclude certain points in time from the re-projection process due to excessive noise, data error, or other factors. Step 1125 of the process includes generating a combined point cloud using the transformed data. Illustratively, the controller can add the re-projected data from multiple (selected) frames to the frame of point data initially associated with the target point in time, thereby accumulating temporally sequenced frames of data to form a combined point cloud as if the data were all acquired by the laser unit at the target point in time.

Figure 12:
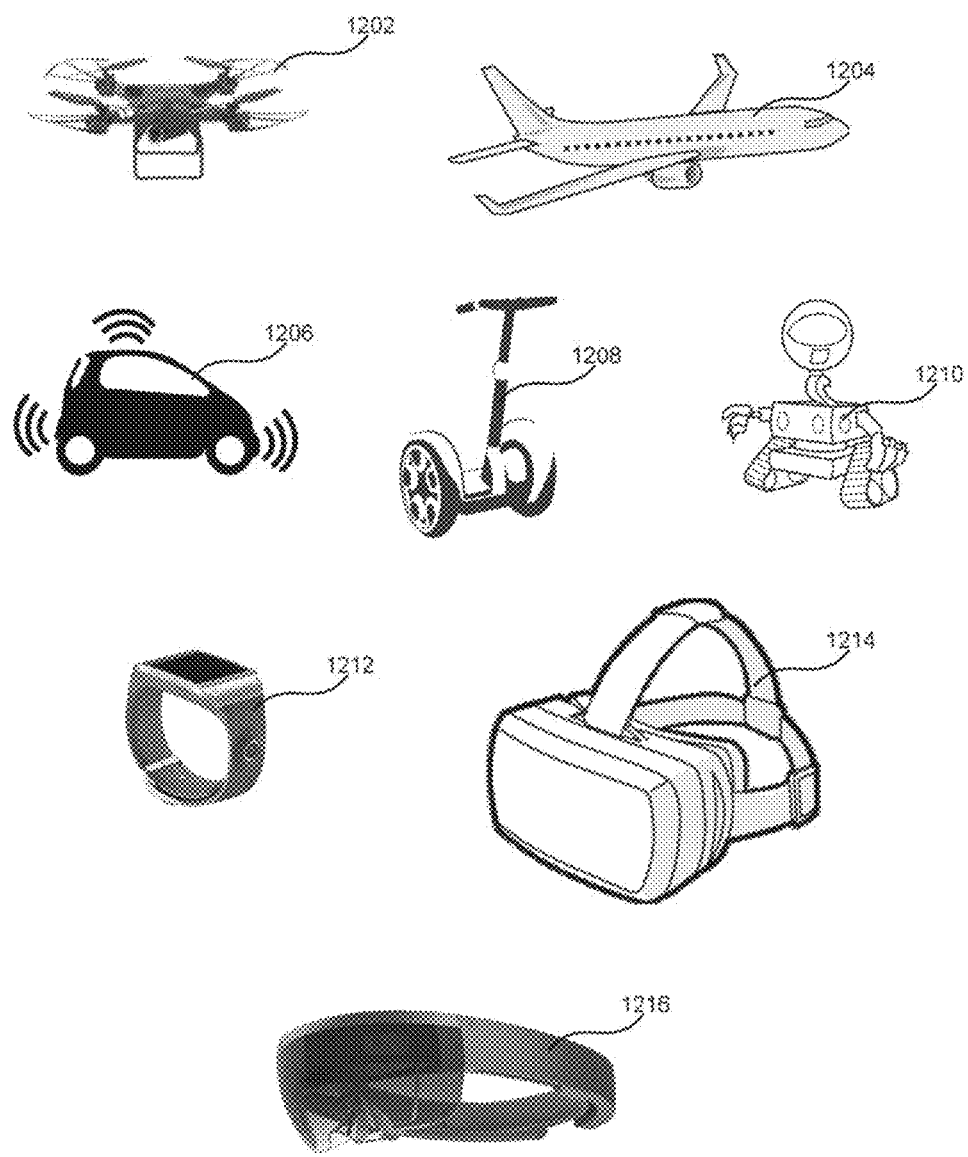
FIG. 12 illustrates examples of mobile platforms configured in accordance with some embodiments of the presently disclosed technology.

FIG. 12 illustrates examples of mobile platforms configured in accordance with various embodiments of the presently disclosed technology. As illustrated, a representative mobile platform as disclosed herein may include at least one of an unmanned aerial vehicle (UAV) 1202, a manned aircraft 1204, an autonomous car 1206, a self-balancing vehicle 1208, a terrestrial robot 1210, a smart wearable device 1212, a virtual reality (VR) head-mounted display 1214, or an augmented reality (AR) head-mounted display 1216.

Figure 13:
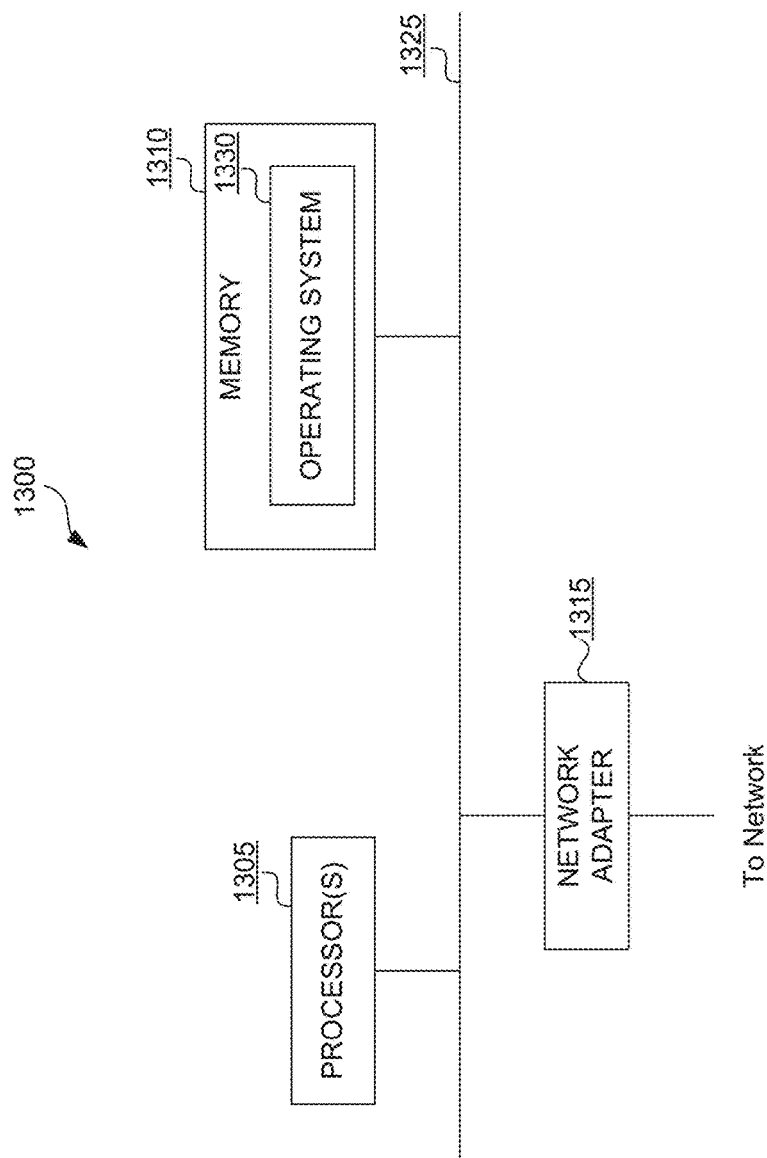
FIG. 13 is a block diagram illustrating a representative architecture for a computer system or device that can be utilized to implement various portions of the presently disclosed technology.

FIG. 13 is a block diagram illustrating an example of the architecture for a computer system or other control device 1300 that can be utilized to implement various portions of the presently disclosed technology. In FIG. 13, the computer system 1300 includes one or more processors 1305 and memory 1310 connected via an interconnect 1325. The interconnect 1325 may represent any one or more separate physical buses, point to point connections, or both, connected by appropriate bridges, adapters, or controllers. The interconnect 1325, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire".

The processor(s) 1305 may include central processing units (CPUs) to control the overall operation of, for example, the host computer. In certain embodiments, the processor(s) 1305 accomplish this by executing software or firmware stored in memory 1310. The processor(s) 1305 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 1310 can be or include the main memory of the computer system. The memory 1310 represents any suitable form of random access memory (RAM), read-only memory (ROM), flash memory, or the like, or a combination of such devices. In use, the memory 1310 may contain, among other things, a set of machine instructions which, when executed by processor 1305, causes the processor 1305 to perform operations to implement embodiments of the present invention.

Also connected to the processor(s) 1305 through the interconnect 1325 is a (optional) network adapter 1315. The network adapter 1315 provides the computer system 1300 with the ability to communicate with remote devices, such as the storage clients, and/or other storage servers, and may be, for example, an Ethernet adapter or Fiber Channel adapter.

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic," as used herein, can include, for example, programmable circuitry programmed with specific software and/or firmware, special-purpose hardwired circuitry, or a combination thereof.

Some embodiments of the disclosure have other aspects, elements, features, and steps in addition to or in place of what is described above. These potential additions and replacements are described throughout the rest of the specification. Reference in this specification to "various embodiments," "certain embodiments," or "some embodiments" means that a particular feature, structure, or characteristic described in connection with the embodiment is included in at least one embodiment of the disclosure. These embodiments, even alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments.

As discussed above, the disclosed technology can achieve high precision calibration between laser sensors (e.g., low-cost laser sensors with limited FOV) and vision sensors (e.g., monocular cameras), which may use combined point clouds generated in accordance with point data obtained at different times. While advantages associated with certain embodiments of the technology have been described in the context of those embodiments, other embodiments may also exhibit such advantages, and not all embodiments need necessarily exhibit such advantages to fall with within the scope of the present technology. For example, the disclosed technology can be applied to achieve calibration between any two type of sensors with different data collection resolution and/or rate. Accordingly, the present disclosure and associated technology can encompass other embodiments not expressly shown or described herein.

To the extent any materials incorporated herein conflict with the present disclosure, the present disclosure controls.

We claim:

1. A computer-implemented method for calibrating at least a laser unit and a vision unit, both carried by a common mobile platform, the method comprising:

combining temporally sequenced sets of point information obtained from the laser unit to form a point cloud in a reference system associated with the mobile platform based on one or more transformation rules, wherein the one or more transformation rules specify transformations between reference systems associated with the laser unit at different points in time within a time period to a target reference system associated with the laser unit at a target point in time;

extracting a plurality of feature points from the point cloud, wherein the feature points correspond to a threshold discontinuity in depth measurement;

evaluating the feature points with edge information obtained from the vision unit based at least in part on a target function, the target function defined at least in part by positions of the feature points when projected to a reference system associated with the vision unit;
generating at least one calibration rule for calibration between the laser unit and the vision unit based at least in part on evaluating the feature points with the edge information; and
causing calibration between the laser unit and the vision unit using the at least one calibration rule.

2. The method of claim 1, further comprising converting an image obtained from the vision unit into a grayscale image.

3. The method of claim 2, further comprising determining the edge information based at least in part on a difference between at least one pixel of the grayscale image and one or more pixels within a threshold proximity of the at least one pixel.

4. The method of claim 3, wherein evaluating the feature points with the edge information comprises projecting the feature points to respective positions in an image obtained from the vision unit.

5. The method of claims 1, wherein generating at least one calibration rule comprises optimizing the target function.

6. The method of claim 5, wherein optimizing the target function is based at least in part on an exhaustion method.

7. The method of claim 5, wherein optimizing the target function comprises optimizing the target function in accordance with at least six degrees of freedom.

8. A non-transitory computer-readable medium storing computer-executable instructions that, when executed, cause one or more processors associated with a mobile platform to perform actions, the actions comprising:
combining temporally sequenced sets of point information obtained from a laser unit to form a point cloud in a reference system associated with the mobile platform based on one or more transformation rules, wherein the one or more transformation rules specify transformations between reference systems associated with the laser unit at different points in time within a time period to a target reference system associated with the laser unit at a target point in time;
extracting a plurality of feature points from the point cloud, wherein the feature points correspond to a threshold discontinuity in depth measurement;
evaluating the feature points with edge information obtained from a vison unit based at least in part on a target function, the target function defined at least in part by positions of the feature points when projected to a reference system associated with the vision unit;
generating at least one calibration rule for calibration between the laser unit and the vision unit based at least in part on evaluating the feature points with the edge information; and
causing calibration between the laser unit and the vision unit using the at least one calibration rule.

9. The computer-readable medium of claim 8, wherein the actions further comprise transforming the plurality of feature points based at least in part on a set of transformation rules.

10. The computer-readable medium of claim 9, wherein the set of transformation rules is at least partially defined in accordance with a position and orientation of the vision unit relative to the mobile platform.

11. The computer-readable medium of claim 9, wherein the set of transformation rules comprises a transformation matrix.

12. The computer-readable medium of claim 8, wherein the reference system associated with the mobile platform comprises a coordinate system.

13. The computer-readable medium of claim 8, wherein extracting the plurality of feature points is based at least in part on one or more depth differences between points within the point cloud.

14. The computer-readable medium of claim 13, wherein extracting the plurality of feature points is further based on a relationship between the one or more depth differences and the threshold discontinuity.

15. The computer-readable medium of claim 8, wherein the laser unit comprises at least one laser sensor that has a field of view (FOV) smaller than at least one of 360 degrees, 180 degrees, 90 degrees, or 60 degrees.

16. The computer-readable medium of claim 8, wherein the vision unit includes a monocular camera.

17. A vehicle including a programmed controller that at least partially controls one or more motions of the vehicle, wherein the programmed controller includes one or more processors configured to:
combine temporally sequenced sets of point information obtained from a laser unit to form a point cloud in a reference system associated with the vehicle based on one or more transformation rules, wherein the one or more transformation rules specify transformation rules between reference systems associated with the laser unit at different points in time within a time period to a target reference system associated with the laser unit at a target point in time;
extract a plurality of feature points from the point cloud, wherein the feature points correspond to a threshold discontinuity in depth measurement.
evaluate the feature points with edge information obtained from a vision unit based at least in part on a target function, the target function defined at least in part by positions of the feature points when projected to a reference system associated with the vision unit;
generate at least one calibration rule for calibration between the laser unit and the vision unit based at least in part on evaluating the feature points with the edge information; and
cause calibration between the laser unit and the vision unit using the at least one calibration rule.

18. The vehicle of claim 17, wherein extracting the plurality of feature points comprises transforming a subset of the point cloud based at least in part on a set of transformation rules.

19. The vehicle of claim 18, wherein the set of transformation rules is at least partially defined in accordance with a position and orientation of the vision unit relative to the vehicle.

20. The vehicle of claim 18, wherein the one or more processors are further configured to select the subset of the point cloud based at least in part on one or more depth differences between points within the point cloud.

21. The vehicle of claim 20, wherein selecting the subset of the point cloud comprises selecting a subset of points based at least in part on one set of the temporally sequenced sets of point information.

22. The vehicle of claim 17, wherein the one or more processors are further configured to convert an image obtained from the vision unit into a grayscale image.

23. The vehicle of claim 22, wherein the one or more processors are further configured to determine the edge information based at least in part on a difference between at least one pixel of the grayscale image and one or more pixels within a threshold proximity of the at least one pixel.

24. The vehicle of claim 17, wherein the at least one calibration rule includes a rule for transformation between a reference system associated with the laser unit and the reference system associated with the vision unit.

25. The vehicle of claim 17, wherein the one or more processors are further configured to detect a difference between (a) the generated at least one calibration rule with (b) one or more previously generated calibration rules.

26. The vehicle of claim 17, wherein the vehicle corresponds to at least one of an unmanned aerial vehicle (UAV), a manned aircraft, an autonomous car, a self-balancing vehicle, or a robot.

\* \* \* \* \*